United States Patent
Yang et al.

(10) Patent No.: US 11,184,760 B2
(45) Date of Patent: Nov. 23, 2021

(54) SYSTEMS AND METHODS FOR UPDATING SUBSCRIBER DATA

(71) Applicant: Telefonaktiebolaget LM Ericsson (publ), Stockholm (SE)

(72) Inventors: Yong Yang, Kållered (SE); Maria Cruz Bartolomé Rodrigo, Madrid (ES); Jesus-Angel de-Gregorio-Rodriguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 15/567,568

(22) PCT Filed: Jun. 29, 2017

(86) PCT No.: PCT/EP2017/066174
§ 371 (c)(1),
(2) Date: Oct. 18, 2017

(87) PCT Pub. No.: WO2018/002247
PCT Pub. Date: Jan. 4, 2018

(65) Prior Publication Data
US 2018/0227746 A1    Aug. 9, 2018

Related U.S. Application Data

(60) Provisional application No. 62/357,660, filed on Jul. 1, 2016.

(51) Int. Cl.
*H04W 8/18* (2009.01)
*H04W 8/04* (2009.01)
*H04W 8/20* (2009.01)

(52) U.S. Cl.
CPC ............. *H04W 8/183* (2013.01); *H04W 8/04* (2013.01); *H04W 8/186* (2013.01); *H04W 8/20* (2013.01)

(58) Field of Classification Search
CPC ..... H04W 52/0235; H04W 8/04; H04W 8/12; H04W 8/18; H04W 8/183; H04W 8/186; H04W 8/20
See application file for complete search history.

(56) References Cited

U.S. PATENT DOCUMENTS

| 8,938,422 B1* | 1/2015 | Liu ..................... G06F 16/9562 707/628 |
| 2013/0111461 A1* | 5/2013 | Zubas ..................... G06F 8/654 717/173 |

(Continued)

FOREIGN PATENT DOCUMENTS

WO    2016045755 A1    3/2016

OTHER PUBLICATIONS

Author Unknown, "Technical Specification Group Services and System Aspects; Machine-Type and other mobile data applications Communications enhancements (Release 12)," Technical Report 23.887, Version 1.2.0, 3GPP Organizational Partners, Aug. 2013, 153 pages.

(Continued)

*Primary Examiner* — Margaret G Mastrodonato
(74) *Attorney, Agent, or Firm* — Withrow & Terranova, PLLC

(57) ABSTRACT

Systems and methods for updating subscriber data are disclosed. In some embodiments, a method of operation of a serving node in a communication network for updating subscriber data includes receiving a modification of subscriber data for one or more subscribers and determining if updates to the subscriber data for the one or more subscribers are needed now. In response to determining that updates are needed now, the method includes communicating the modification for subscribers to one or more additional nodes and/or initiating other types of signaling towards other network nodes as a result. In response to determining that (Continued)

updates are not needed now, the method includes postponing the communication of the modification of the subscriber data for the one or more subscribers. In this way, signaling floods towards external network elements may be avoided when a modification is performed to subscription data that affects multiple subscribers (potentially even millions).

24 Claims, 10 Drawing Sheets

(56) References Cited

U.S. PATENT DOCUMENTS

| | | | |
|---|---|---|---|
| 2013/0283257 A1* | 10/2013 | Sen | G06F 8/656 |
| | | | 717/173 |
| 2015/0215768 A1 | 7/2015 | Dong et al. | |
| 2015/0358898 A1 | 12/2015 | Lair et al. | |
| 2016/0286466 A1* | 9/2016 | Huang | H04W 48/16 |

OTHER PUBLICATIONS

Author Unknown, "Technical Specification Group Core Network and Terminals; Study on S6a/S6d Shared Data Update; (Release 13)," Technical Report 29.813, Version 13.0.0, 3GPP Organizational Partners, Dec. 2012, 11 pages.

Author Unknown, "Technical Specification Group Core Network and Terminals; Organization of subscriber data (Release 13)," Technical Specification 23.008, Version 13.5.0, 3GPP Organizational Partners, Jun. 2016, 130 pages.

Author Unknown, "Technical Specification Group Services and System Aspects; General Packet Radio Service (GPRS); Service description; Stage 2 (Release 12)," Technical Specification 23.060, Version 12.0.0, 3GPP Organizational Partners, Mar. 2013, 338 pages.

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.

Author Unknown, "Technical Specification Group Core Network and Terminals; General Packet Radio Service (GPRS); GPRS Tunnelling Protocol (GTP) across the Gn and Gp interface (Release 12)," Technical Specification 29.060, Version 12.0.0, 3GPP Organizational Partners, Mar. 2013, 176 pages.

Author Unknown, "Technical Specification Group Core Network and Terminals; Evolved Packet System (EPS) Mobility Management Entity (MME) and Serving GPRS Support Node (SGSN) related interfaces based on Diameter protocol (Release 13)," Technical Specification 29.272, Version 13.5.1, 3GPP Organizational Partners, Mar. 2016, 151 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.0.0, 3GPP Organizational Partners, Mar. 2013, 228 pages.

Ericsson, et al., "C4-164291: Solution to avoid high load resulting from shared subscription data update," 3rd Generation Partnership Project (3GPP), TSG CT4 Meeting #74, Change Request 0656, Version 14.0.0, Jul. 25-29, 2016, 2 pages, Tenerife, Spain.

Nokia, et al., "C4-163247: Shared Subscription data update," 3rd Generation Partnership Project (3GPP), Version 13.5.1, May 23-27, 2016, 13 pages, Osaka, Japan.

International Search Report and Written Opinion for International Patent Application No. PCT/EP2017/066174, dated Nov. 6, 2017, 21 pages.

European Telecommunications Standards Institute, "LTE; General Packet Radio Service (GPRS) enhancements for Evolved Universal Terrestrial Radio Access Network (E-UTRAN) access (Release 13)," 3rd Generation Partnership Project (3GPP), Technical Specification 23.401, Version 13.6.1, May 2016, 367 pages, Sophia-Antipolis, France.

European Telecommunications Standards Institute, "Universal Mobile Telecommunications System (UMTS); LTE; Evolved Packet System (EPS); Mobility Management Entity (MME), and Serving GPRS Support Node (SGSN) related interfaces, based on Diameter protocol (Release 13)," 3rd Generation Partnership Project (3GPP), Technical Specification 29.272, Version 13.5.1, May 2016, 154 pages, Sophia-Antipolis, France.

Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.7.0, 3GPP Organizational Partners, Jun. 2016, 372 pages.

Examination Report for European Patent Application No. 17735465.1, dated Nov. 7, 2019, 2 pages.

Search Report for Japanese Patent Application No. 2018-567737, dated Oct. 23, 2019, 60 pages.

Office Action for Japanese Patent Application No. 2018-567737, dated Oct. 25, 2019, 8 pages.

Decision of Refusaal for Japanese Patent Application No. 2018-567737, dated Apr. 13, 2020, 10 pages.

* cited by examiner

SYSTEMS AND METHODS FOR UPDATING SUBSCRIBER DATA

RELATED APPLICATIONS

This application claims the benefit of provisional patent application Ser. No. 62/357,660, filed Jul. 1, 2016, the disclosure of which is hereby incorporated herein by reference in its entirety.

TECHNICAL FIELD

The present disclosure relates to updating subscriber data.

BACKGROUND

In a cellular communication network such as a Long Term Evolution (LTE) network, subscription data is stored in a Home Subscriber Service (HSS) per subscriber and the update of subscriber data is always done individually for each subscriber. For instance, HSS standard Third Generation Partnership Project (3GPP) interfaces (S6a/d, Sh) are only allowed to modify data per subscriber; however a potential high amount of subscribers may share a common subset of the same data, and this may be more common due to new technologies like Machine-Type Communications (MTC) and Cellular Internet of Things (C-IoT). In these cases, data provisioning and internal data storage may be optimized in a way that data shared by multiple subscriptions is just provisioned once in the HSS, although it applies to a group of subscribers.

Therefore, when data is updated in the HSS, it requires that changes are propagated to the serving nodes (e.g., Mobility Management Entity (MME)/Serving General Packet Radio Service (GPRS) Support Node (SGSN)), via S6a/S6d interface. Then, if the modified/added/deleted data affects a potential massive amount of subscribers, it would require sending a massive amount of messages/commands from the HSS to the MME/SGSN as long as defined commands in S6a/d interface allow providing modifications just for one single subscriber (using Insert Subscriber Data/Delete Subscriber Data commands).

In order to optimize S6a/d traffic, there is already a proposal (C4-163247) to 3GPP TS 29.272 to extend the existing Reset command based on 3GPP TR 29.813. This proposal includes the possibility for the Reset command to include the data to be either added/modified or deleted, as well as the identification of the affected subscribers by this change.

The identification of affected subscribers is based on the "Reset-ID," that can be included as part of the subscription information for each subscriber in the Update Location Answer (ULA) or Insert Subscriber Data Request (IDR) command from the HSS. The Reset-ID, as originally defined, uniquely identifies a fallible resource in the HSS on which the user International Mobile Subscriber Identity (IMSI) depends that allows that in the event of a restart of the fallible resource, a Reset message containing the Reset-ID will exactly identify the impacted subscribers. For the optimization of S6a/d traffic, the usage of the Reset-ID is proposed to be extended to identify a group of subscribers that share the same data.

That proposal decreases the signaling for S6a/d traffic when a subscription data modification affects multiple subscribers. However, that proposal does not cover the impact on other interfaces.

In fact, once the MME/SGSN receives the data to be modified and the identification of impacted subscribers, it needs to locally update that information, but the changes are not limited to the MME/SGSN, and other network elements (e.g., Packet-Data Network Gateway (PDN-GW or P-GW)) and even the User Equipment (UE), via the eNodeB, may need to be informed of those data changes. This requires a single message interchange per subscriber, which in the event of a high amount of impacted subscribers may cause a signaling flooding. As such, improved systems and methods for updating subscriber data are needed.

SUMMARY

Systems and methods for updating subscriber data are disclosed. The present disclosure provides, in some embodiments, a way to optimize the mechanism to propagate subscription changes from a serving node (e.g., Mobility Management Entity (MME)/Serving General Packet Radio Service (GPRS) Support Node (SGSN)) to other impacted network elements (such as PDN-GW, eNodeB, etc.) in order to avoid signaling floods in those interfaces. In some embodiments, a mechanism in a serving node avoids signaling floods towards external network elements when a modification is performed to subscription data that affects multiple subscribers (potentially even millions).

In some embodiments, when a modification for multiple subscribers is received in the MME/SGSN from the Home Subscriber Service (HSS), then the subscription data is stored locally. Changes are only spread to other network elements when fresh data is required to be propagated immediately (i.e. when a User Equipment (UE) is in a CONNECTED or ACTIVE state). When changes are not required immediately, the subscriber is marked to identify that changes are only stored locally, but not communicated to other network elements.

In some embodiments, when the UE gets active (i.e., after the serving node detects the first radio contact from the UE), the MME/SGSN identifies if there are changes stored locally that needs to be spread, and if so, proceeds accordingly. In some embodiments, spreading the changes may include a modification of the subscription data that results in a certain interaction with another node.

In some embodiments, a method of operation of a serving node in a communication network for updating subscriber data includes receiving a modification of subscriber data for one or more subscribers and determining if fresh data for the subscriber data for the one or more subscribers is needed. In response to determining that fresh data is needed, the method includes communicating the modification of the subscriber data for the one or more subscribers to one or more additional nodes. In response to determining that fresh data is not needed, the method includes postponing the communication of the modification of the subscriber data for the one or more subscribers and/or initiating other types of signaling towards other network nodes as a result of such modification. In this way, signaling floods towards external network elements may be avoided when a modification is performed to subscription data that affects multiple subscribers (potentially even millions).

In some embodiments, the method also includes determining that a user equipment has entered an active state where the user equipment has an associated subscriber and determining if communication of a modification of the subscriber data for the subscriber has been postponed. In response to determining that the communication has been postponed, the method includes communicating the modification of the subscriber data for the subscriber to one or more additional nodes.

In some embodiments, the one or more subscribers comprise a plurality of subscribers. In some embodiments, receiving the modification of subscriber data comprises receiving the modification of subscriber data from an HSS. In some embodiments, receiving the modification of subscriber data for the one or more subscribers comprises receiving the modification of subscriber data for a group of subscribers. In some embodiments, the group of subscribers is identified by a Reset-ID.

In some embodiments, determining if fresh data for the subscriber data for the one or more subscribers is needed comprises determining if a user equipment associated with the subscriber is in an active state. In some embodiments, the active state is a CONNECTED state.

In some embodiments, postponing the communication of the modification of the subscriber data for the one or more subscribers comprises storing an indication that the one or more subscribers have a modification that needs to be communicated. In some embodiments, the indication is a subscription data updated flag. In some embodiments, the subscription data updated flag has a value of NOT_COMMITTED.

In some embodiments, the indication is a specific value for a "Location Information Confirmed in the HSS" parameter. In some embodiments, the specific value is UPDATED_NOT_COMMITTED.

In some embodiments, the serving node is a MME. In some embodiments, the serving node is a SGSN. In some embodiments, at least one of the one or more subscribers is associated with a Machine-Type Communications (MTC) device.

In some embodiments, a method of operation of a serving node in a communication network for updating subscriber data includes determining that a user equipment has entered an active state where the user equipment has an associated subscriber and determining if communication of a modification of the subscriber data for the subscriber has been postponed. In response to determining that the communication has been postponed, the method includes communicating the modification of the subscriber data for the subscriber to one or more additional nodes.

In some embodiments, a method of operation of a serving node in a communication network for updating subscriber data includes determining that a user equipment has moved to a second serving node where the user equipment has an associated subscriber and determining if communication of a modification of the subscriber data for the subscriber has been postponed. In response to determining that the communication has been postponed, the method includes communicating the modification of the subscriber data for the subscriber to the second serving node.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any two or more embodiments described in this document may be combined in any way with each other. The described embodiments are not limited to Long Term Evolution (LTE) either, but can be adapted in other Radio Access Technologies (RATs) too, e.g., Universal Terrestrial Radio Access (UTRA), LTE-Advanced (LTE-A), Fifth Generation (5G), New Radio (NR), Cellular Internet of Things (C-IoT), WiFi, Bluetooth, etc.

In some embodiments a non-limiting term "User Equipment device (UE)" is used. The UE herein can be any type of wireless device capable of communicating with a network node or another UE over radio signals. The UE may also be a radio communication device, a target device, a Device-to-Device (D2D) UE, a machine type UE or a UE capable of Machine-to-Machine (M2M) communication, a sensor equipped with a UE, an iPad, a tablet, mobile terminals, a smart phone, Laptop Embedded Equipment (LEE), Laptop Mounted Equipment (LME), Universal Serial Bus (USB) dongles, Customer Premises Equipment (CPE), etc.

Also in some embodiments the generic terminology "network node" is used. It can be any kind of network node which may comprise of a radio network node such as a base station, a radio base station, a base transceiver station, a base station controller, a network controller, an enhanced or evolved Node B (eNB), a Node B, a Multi-Cell/Multicast Coordination Entity (MCE), a relay node, an access point, a radio access point, a Remote Radio Unit (RRU) Remote Radio Head (RRH), a core network node (e.g., a Mobility Management Entity (MME), a Self-Organizing Network (SON) node, a coordinating node, a positioning node, a Minimization of Drive Tests (MDT) node, etc.), or even an external node (e.g., a third party node, a node external to the current network), etc.

Figure 1:
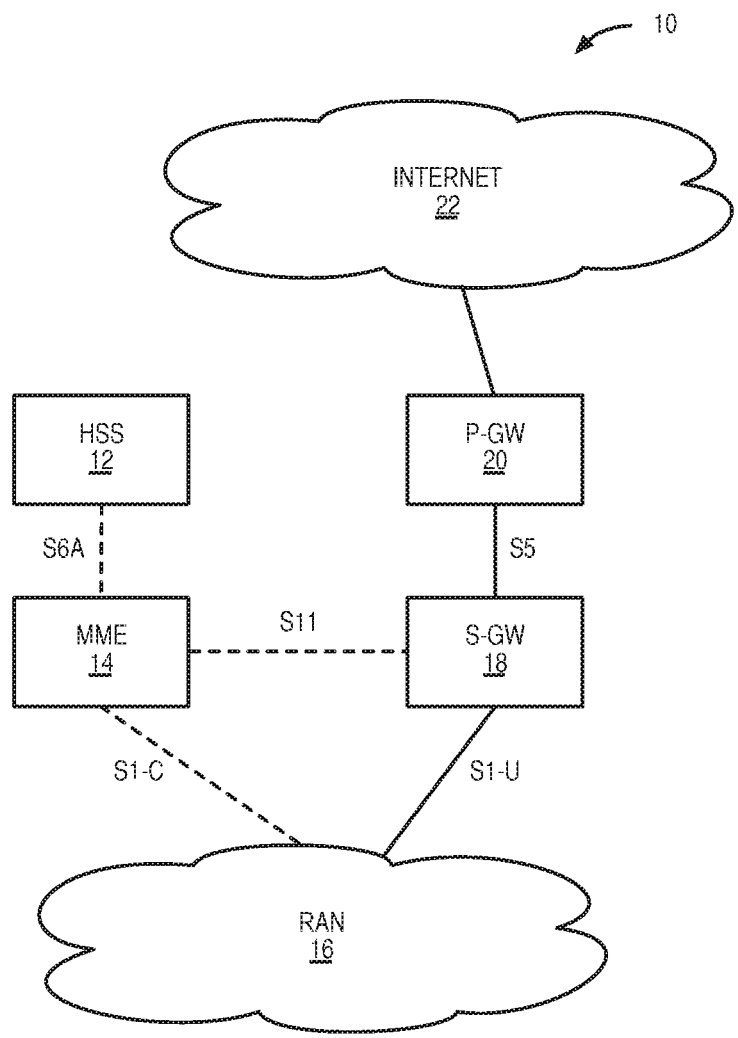
FIGS. 1 through 3 illustrate an exemplary cellular communications network in which embodiments of the present disclosure may be implemented.
Figure 2:
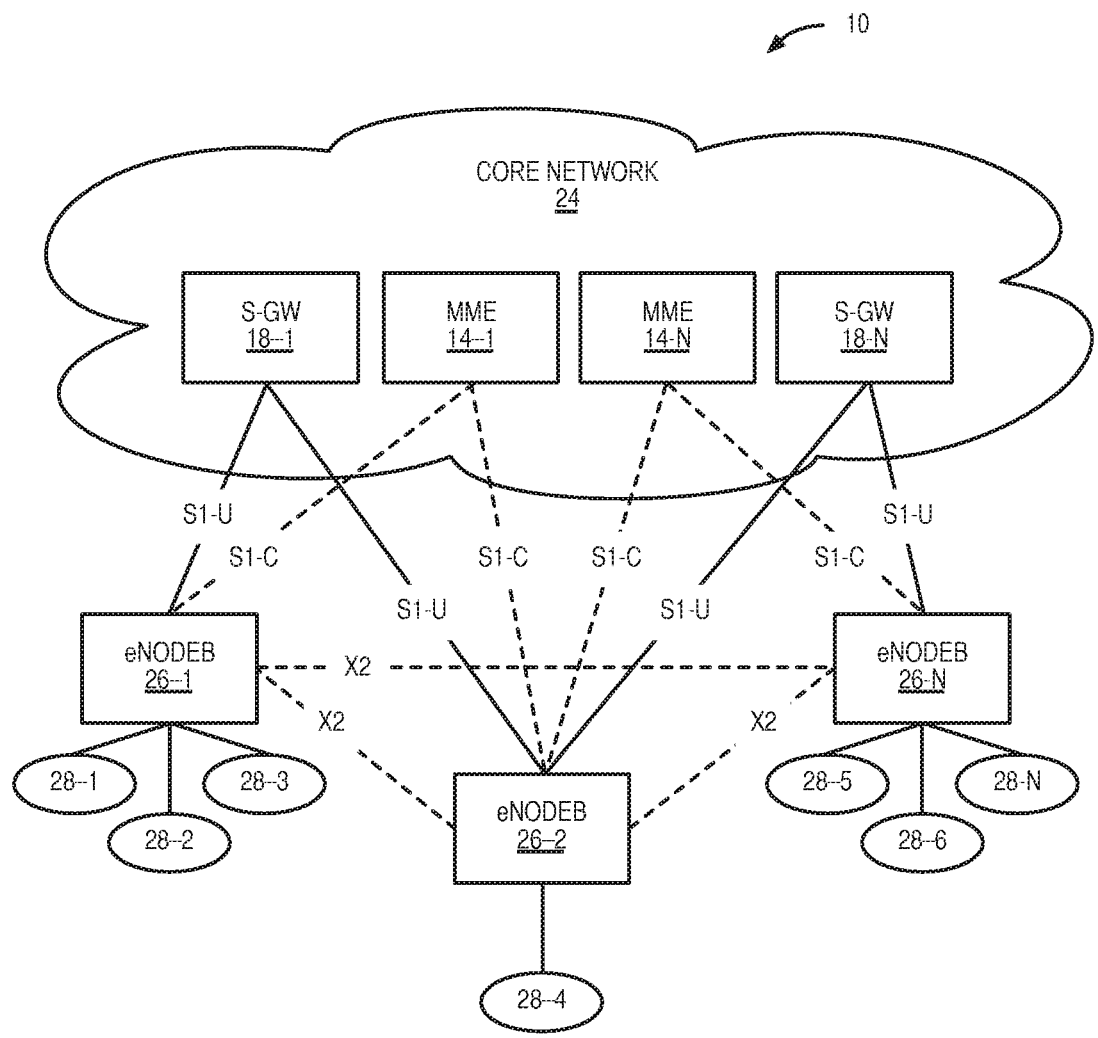
Figure 3:
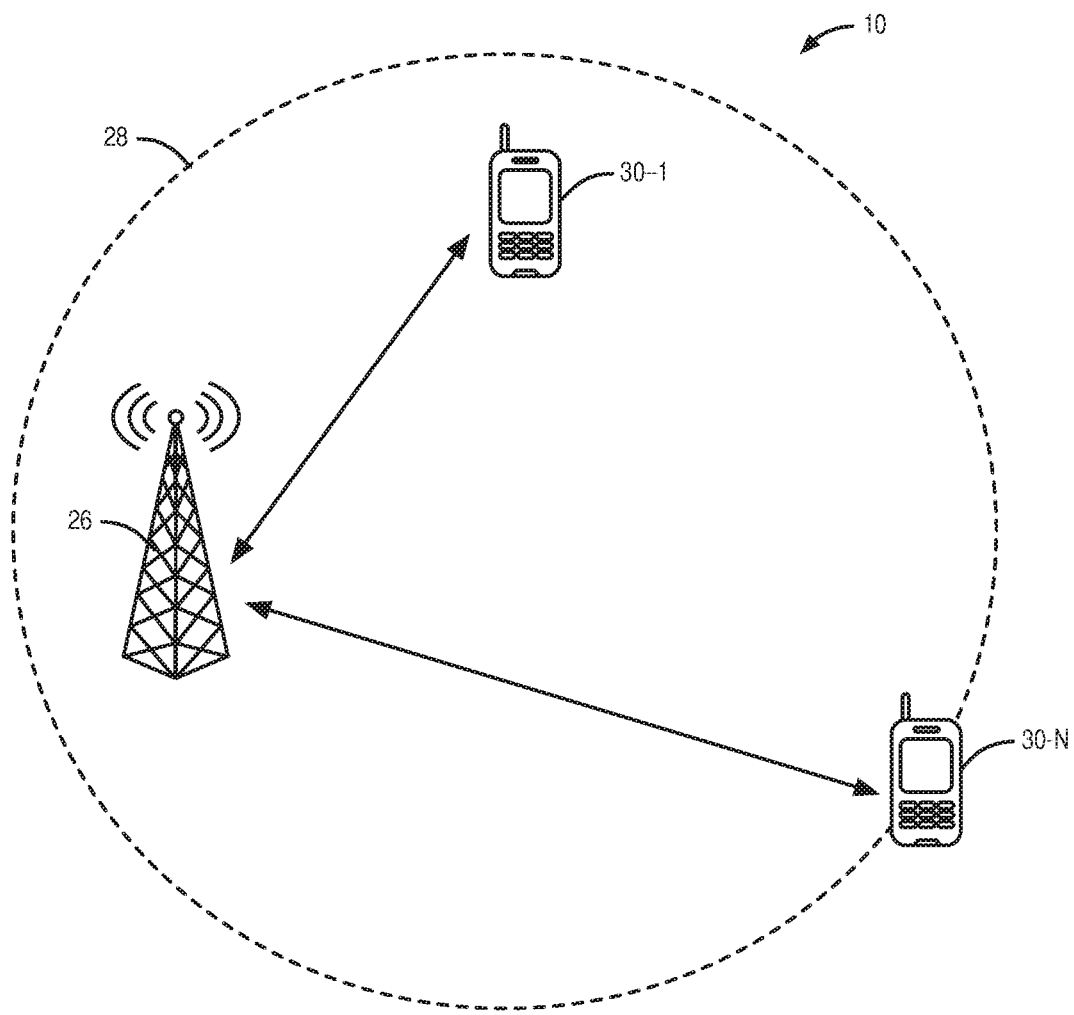

FIGS. 1 through 3 illustrate an exemplary cellular communications network 10 in which embodiments of the present disclosure may be implemented. FIG. 1 illustrates an exemplary core network architecture including a Home Subscriber Service (HSS) 12, Mobility Management Entity (MME) 14, Radio Access Network (RAN) 16, Serving Gateway (S-GW) 18, Packet Data Network Gateway (P-GW) 20, and the internet 22. The HSS 12 is a database containing subscriber information and profiles. The MME 14 is a control-plane node, and it is responsible for connection/release of bearers to a UE, handling of IDLE to ACTIVE transitions, etc. RAN 16 will be discussed in more detail in regard to FIG. 2 and provides the radio access for UEs. The S-GW 18 is a user-plane node connecting the core network to the RAN 16 which acts as a mobility anchor when UEs move between base stations, etc. The P-GW 20 connects the core network to the internet 22 and allocates the IP addresses for UEs. It should be noted that these nodes are logical nodes. In some implementations, several of these logical nodes may be combined.

FIG. 2 illustrates an exemplary RAN 16 including Core Network 24 which has multiple MMEs 14-1 through 14-N and multiple S-GWs 18-1 through 18-N. These nodes are connected to multiple eNBs 26-1 through 26-N which are responsible for all radio-related functions in one or several cells 28-1 through 28-N. FIG. 3 shows a single eNB 26 providing a cell 28 with any number of UEs 30-1 through 30-N.

As discussed above, when data is updated in the HSS 12, it requires that changes are propagated to the serving nodes (e.g., MME 14/Serving General Packet Radio Service (GPRS) Support Node (SGSN)). Then, if the modified/added/deleted data affects a potential massive amount of subscribers, it would require sending a massive amount of messages/commands from the HSS 12 to the serving nodes. However, it has been proposed to extend the Reset command to include the data to be either added/modified or deleted, as well as the identification of the subscribers affected by this change. That proposal decreases the signaling for S6a/d traffic when a subscription data modification affects multiple subscribers. However, that proposal does not cover the impact on other interfaces.

In fact, once the serving node receives the data to be modified and the identification of impacted subscribers, it needs to locally update that information, but the changes are not limited to the serving node, and other network elements (e.g., P-GW 20) and even the UE 30 may need to be informed of those data changes. This requires a single message interchange per subscriber, which in the event of a high amount of impacted subscribers may cause a signaling flooding. As such, improved systems and methods for updating subscriber data are needed.

Figure 4:
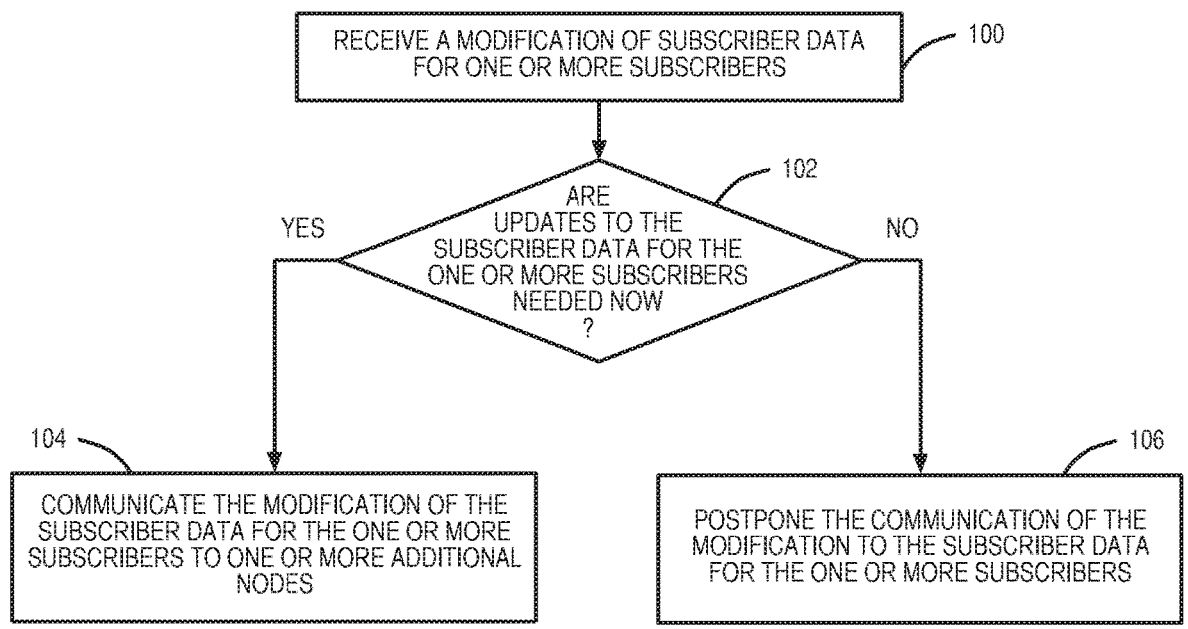
FIGS. 4 through 6 are flow charts that illustrate the operation of a serving node (e.g., a MME or SGSN), according to some embodiments of the present disclosure.
Figure 5:
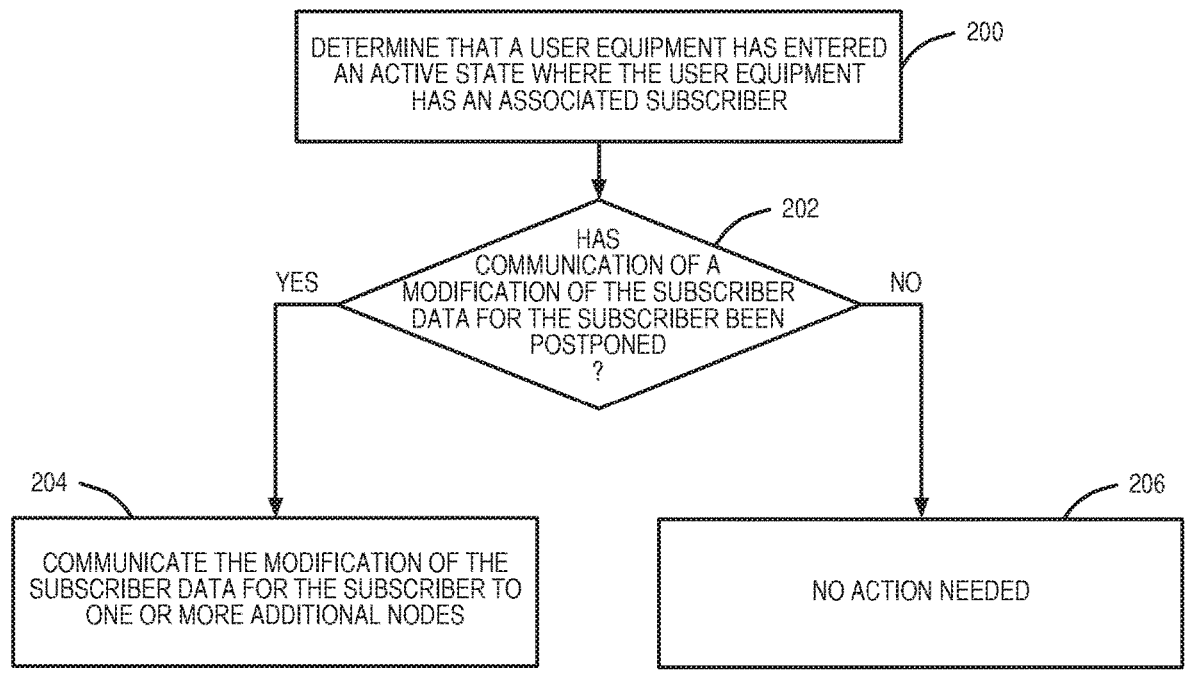
Figure 6:
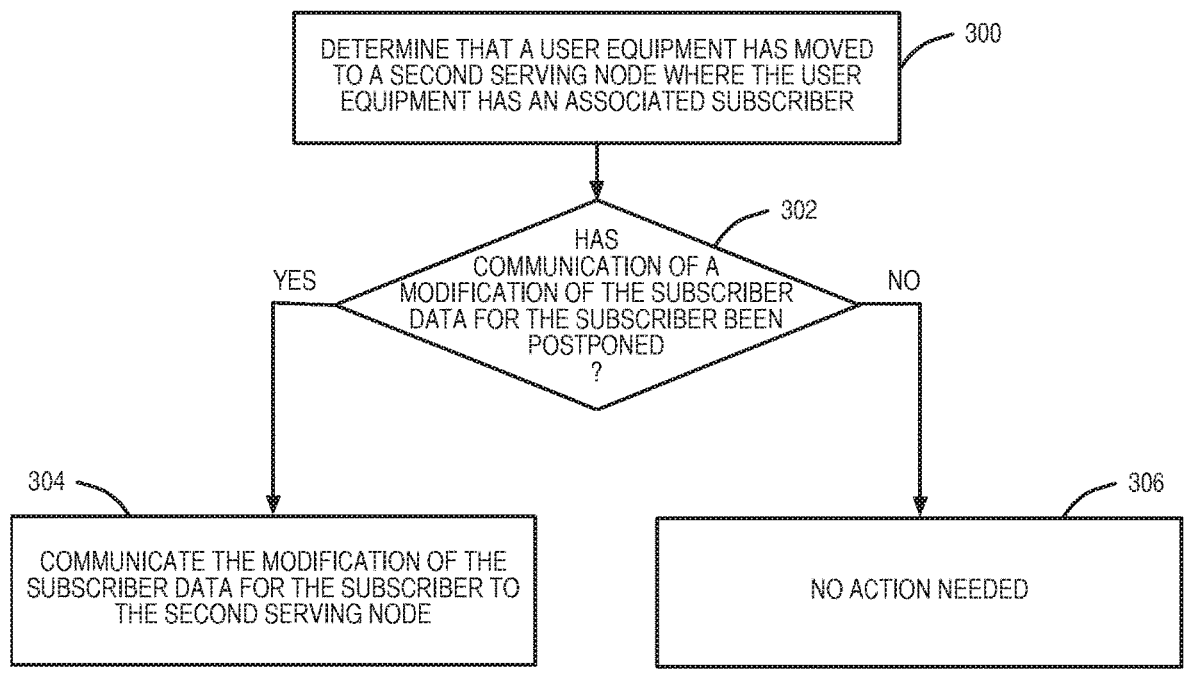

FIGS. 4 through 6 are flow charts that illustrate the operation of a serving node (e.g., a MME 14 or SGSN), according to some embodiments of the present disclosure. FIG. 4 illustrates that the serving node receives a modification of subscriber data for one or more subscribers (step 100). In some embodiments, this modification comes from the HSS 12 and may include a modification for a massive number of subscribers. The serving node then determines if fresh data (for the subscriber data) for the one or more subscribers is needed. In some embodiments, this is accomplished by the serving node determining if updates to the subscriber data are needed now (step 102). In some embodiments, fresh data is needed if a UE 30 associated with the subscriber is in an active or CONNECTED state. On the other hand, if the associated UE 30 is in an IDLE state or is otherwise inactive, fresh data may not be needed. In some embodiments, spreading the changes may include a modification of the subscription data that results in a certain interaction with another node. For example, if the user is allowed to use an APN, and the new subscription data change is to remove this APN from the list of allowed APNs, the MME/SGSN spreads the new APN information to the PDN-GW by checking if the APN is being "used" (i.e., if there are PDN-Connections maintained in a certain PDN-GW) and sends to the PDN-GW a command to terminate those PDN-Connections. Similarly, "data spreading" may include additional signaling resultant from the update of the subscription data.

If updates to the subscriber data are needed now (e.g., fresh data is needed), the serving node immediately performs the updates including any signaling towards other nodes that is needed. The serving node communicates the modification of the subscriber data for the one or more subscribers to one or more additional nodes (step 104). If updates to the subscriber data are not needed now (e.g., fresh data is not needed), the serving node postpones the communication of the modification of the subscriber data for the one or more subscribers (step 106). The deferment may be until the next authenticated radio contact with UE 30. In some embodiments, this avoids signaling floods towards external network elements when a modification is performed to subscription data that affects multiple subscribers.

Once the communication of a modification has been postponed, as in Step 106 above, the serving mode may later determine that fresh data is needed. FIG. 5 illustrates one example of this where the serving node determines that a UE 30 has entered an active state (e.g., a CONNECTED state) where the UE 30 has an associated subscriber (step 200). The serving node then determines if communication of a modification of the subscriber data for the subscriber has been postponed (step 202). If the communication has been postponed, the serving node communicates the modification of the subscriber data for the subscriber to one or more additional nodes (step 204). In this way, the data will be updated when necessary. Also, since UEs entering an active state will likely follow some sort of random or staggered distribution, the required signaling is also distributed over time, avoiding signaling floods towards external network elements when a modification is performed to subscription data that affects multiple subscribers. If no communication has been postponed, no action is needed (step 206).

In some embodiments, a UE 30 may move to a different serving node before the modification is communicated. For instance, the UE 30 may remain in an IDLE mode during the transition. To address this, FIG. 6 illustrates that the serving node determines that a UE 30 has moved to a second serving node where the UE 30 has an associated subscriber (step 300). The serving node determines if communication of a modification of the subscriber data for the subscriber has been postponed (step 302). If the communication has been postponed, the serving node communicates the modification of the subscriber data for the subscriber to the second serving node (step 304). If no communication has been postponed, no action is needed (step 306).

Figure 7:
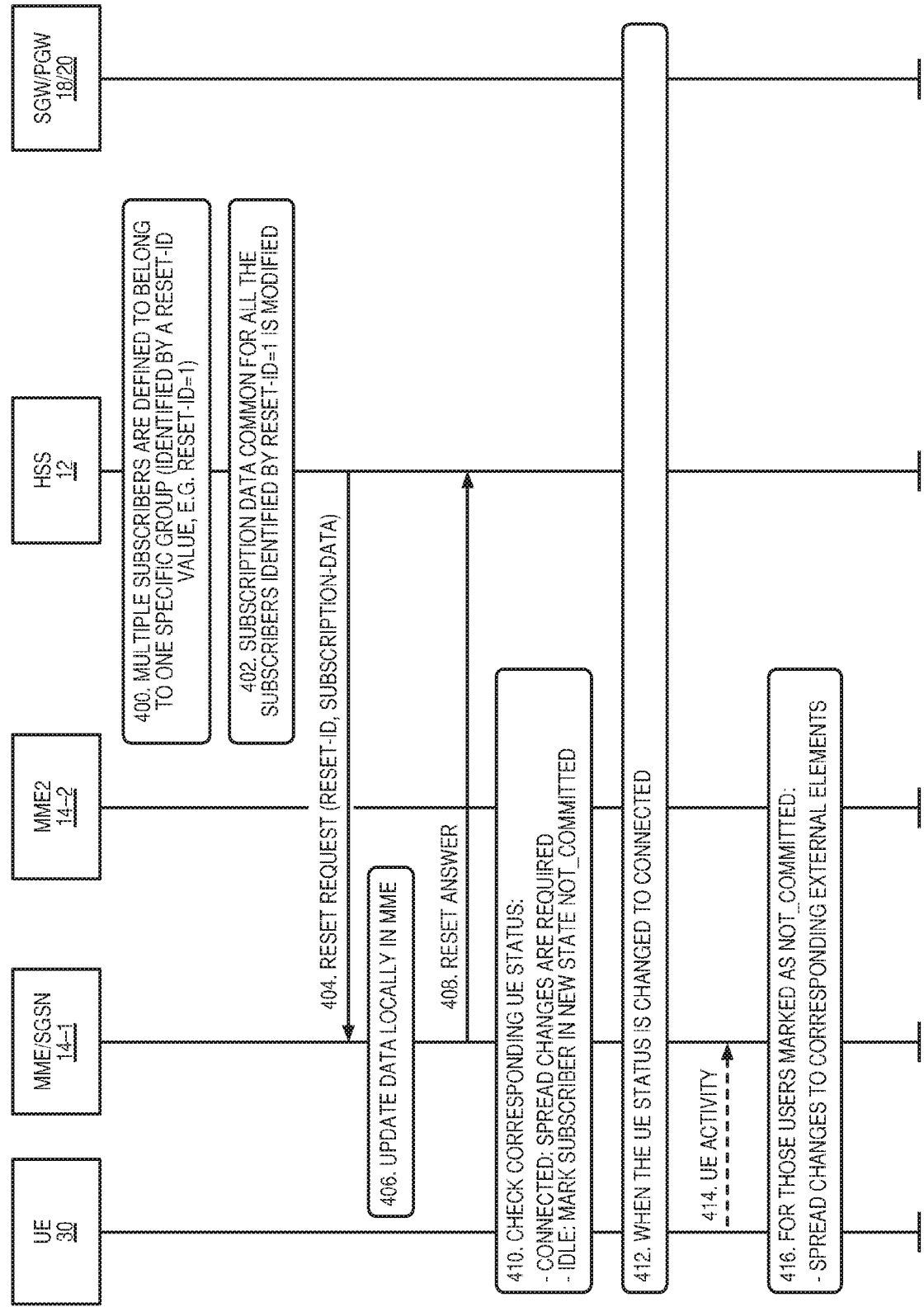
FIG. 7 is a flow chart that illustrates the operation of a cellular communications network, according to some embodiments of the present disclosure.

FIG. 7 is a flow chart that illustrates the operation of a cellular communications network 10, according to some embodiments of the present disclosure. This figure shows a flow that could include several possible embodiments. First, multiple subscribers are defined to belong to one specific group (identified by a Reset-ID value, e.g. Reset-ID=1) (step 400). Some subscription data common for all the subscribers identified by Reset-ID=1 is modified locally in the HSS 12 (step 402). If this data is required to be stored in the MME 14-1/SGSN as well, as required by Third Generation Partnership Project (3GPP) TS 23.008, the HSS 12 needs to provide this information. In this example, this is accomplished by the HSS 12 sending an extended Reset command including identification of affected subscribers (by including Reset-ID=1 in this example) and it includes data that is modified (by including corresponding Subscription-Data Attribute Value Pair (AVP), as described in 3GPP TS 29.272) (step 404).

Upon receiving the modified subscription data, the MME 14-1/SGSN locally updates the received changes (step 406). In this example, the MME 14-1/SGSN sends an answer to the HSS 12 indicating whether the local updates have been successful (step 408).

The MME 14-1/SGSN checks the corresponding UE status for each subscriber that belongs to a received Reset-ID to determine if fresh data is needed (step 410). In some embodiments, fresh data is needed if a UE 30 associated with the subscriber is in an active or CONNECTED state. On the other hand, if the associated UE 30 is in an IDLE state or is otherwise inactive, fresh data may not be needed. If fresh data is needed, the serving node immediately performs the updates including any signaling towards other nodes that is needed. For those subscribers in a CONNECTED state, the subscription data changes need to be propagated immediately as such changes may affect the current data transferring. In some embodiments, this is accomplished according to the existing specification.

For those subscribers in other states (e.g., IDLE), the data changes are not required to be propagated immediately, but they could be propagated when the UE 30 activity is recovered. The deferment may be until the next authenticated radio contact with UE 30. In this case, the signaling is not performed at once, but spread along time since the activity of a group of UEs 30 is random in the sense that the transitions between idle/active states for each UE 30 is expected to be spread over time, randomly. In order to accomplish this, the MME 14-1/SGSN needs to define a new flag, named, for example, "Subscription Data Updated" and set the value as NOT_COMMITTED in this case. This value indicates that the new subscription data is received from the HSS 12 and stored locally in the MME 14-1/SGSN, but the changes have not been propagated yet. In some embodiments, instead of defining a new flag, it is also possible to define a new value for the "Location Information Confirmed in the HSS" parameter, possibly named: UPDATED_NOT_COMMITTED.

The MME 14-1/SGSN then determines when the UE 30 status is changed to CONNECTED (step 412). When the UE 30 becomes active (step 414), for those users for which the "Subscription Data Updated" parameter has the value NOT_COMMITTED, the MME 14-1/SGSN shall spread changes to corresponding external network elements (step 416). In other words, the new subscription data needs to be applied on the network, after the next UE 30 radio contact. As discussed above, spreading the changes may include a modification of the subscription data that results in a certain interaction with another node. For example, if the user is allowed to use an APN, and the new subscription data change is to remove this APN from the list of allowed APNs, the MME/SGSN spreads the new APN information to the PDN-GW by checking if the APN is being "used" (i.e., if there are PDN-Connections maintained in a certain PDN-GW) and sends to the PDN-GW a command to terminate those PDN-Connections. Similarly, "data spreading" may include additional signaling resultant from the update of the subscription data.

In addition, as discussed above in relation to FIG. 6, if the UE 30 moves to another mobility management node with idle mode mobility procedure, the old mobility management node should indicate to the new mobility management node that subscription data has been modified but not communicated. In some embodiments, this is accomplished by setting "Subscription Data Updated" as not committed in the context response message so that the new mobility management node will perform the existing procedure as specified in 5.3.9.2 in TS 23.401 to report the subscription change towards other nodes or so that it will perform any relevant procedures described herein.

According to some of these embodiments, signaling from serving nodes towards other network elements, which is required to propagate subscription data changes, is optimized; avoiding floods and potential overload.

Without these embodiments, a subscription data update for thousands (or even millions) of subscribers could imply an enormous number of messages across multiple interfaces (over GPRS Tunneling Protocol (GTP), S1-AP, etc . . . ), even for users that are not active, which is extremely inefficient and possibly even dangerous for network stability.

Figure 8:
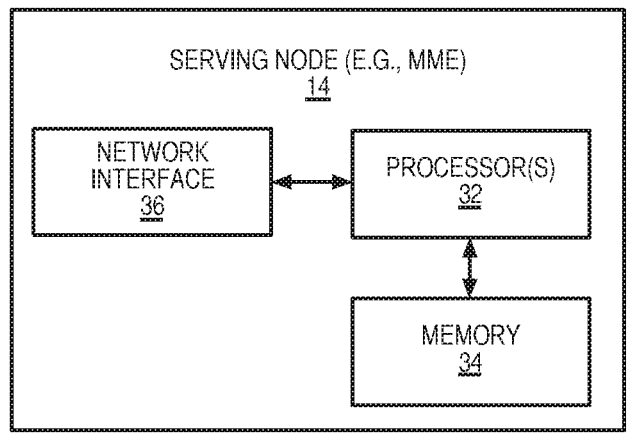
FIGS. 8 through 10 are block diagrams of exemplary embodiments of a serving node (e.g., a MME or SGSN) according to some embodiments of the present disclosure.
Figure 9:
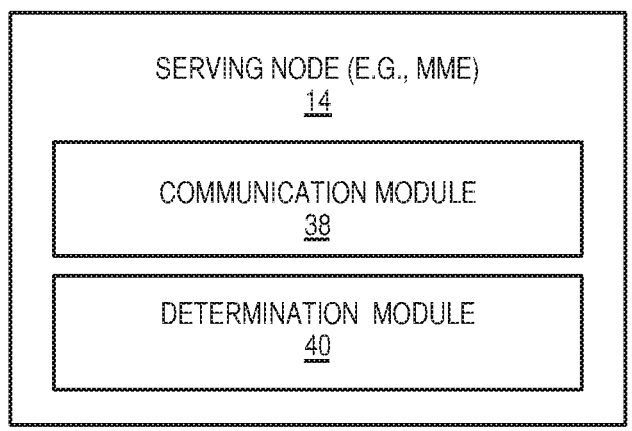
Figure 10:
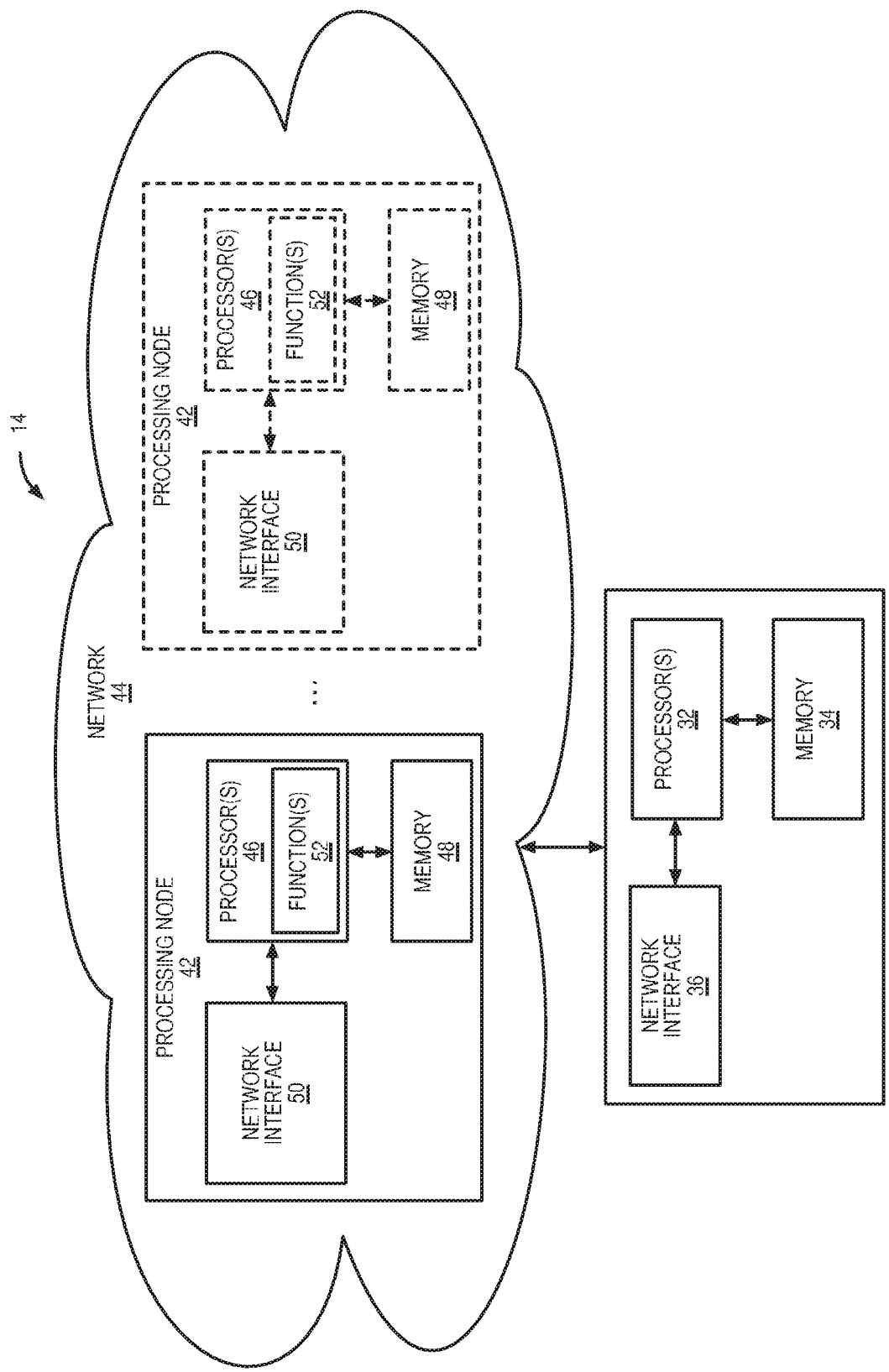

FIGS. 8 through 10 are block diagrams of exemplary embodiments of a serving node 14 (e.g., a MME or SGSN) according to some embodiments of the present disclosure. FIG. 8 is a schematic block diagram of a serving node 14 according to some embodiments of the present disclosure. As illustrated, the serving node 14 includes one or more processors 32 (e.g., Central Processing Units (CPUs), Application Specific Integrated Circuits (ASICs), Field Programmable Gate Arrays (FPGAs), and/or the like), memory 34, and a network interface 36. In some embodiments, the functionality of the serving node 14 described above may be fully or partially implemented in software that is, e.g., stored in the memory 34 and executed by the processor(s) 32.

In some embodiments, a computer program including instructions which, when executed by at least one processor, causes the at least one processor to carry out the functionality of the serving node 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 9 is a schematic block diagram of the serving node 14 according to some other embodiments of the present disclosure. The serving node 14 includes a communication module 38 and a fresh data determination module 40, each of which is implemented in software. The modules 38 and 40 provide the functionality of the serving node 14 described herein.

FIG. 10 is a schematic block diagram that illustrates a virtualized embodiment of the serving node 14 according to some embodiments of the present disclosure. This discussion is equally applicable to other types of network nodes. Further, other types of network nodes may have similar virtualized architectures.

As used herein, a "virtualized" serving node 14 is an implementation of the serving node 14 in which at least a portion of the functionality of the serving node 14 is implemented as a virtual component(s) (e.g., via a virtual machine(s) executing on a physical processing node(s) in a network(s)). As illustrated, in this example, the serving node 14 includes one or more processors 32 (e.g., CPUs, ASICs, FPGAs, and/or the like), the memory 34, and the network interface 36. The network interface 36 is connected to one or more processing nodes 42 coupled to or included as part of a network(s) 44. Each processing node 42 includes one or more processors 46 (e.g., CPUs, ASICs, FPGAs, and/or the like), memory 48, and a network interface 50.

In this example, functions 52 of the Core Network 24 described herein are implemented at the one or more processing nodes 42 or distributed across the serving node 14 in any desired manner. In some particular embodiments, some or all of the functions 52 of the serving node 14 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 is used in order to carry out at least some of the desired functions 52. In some other embodiments, the serving node 14 is entirely virtualized.

In some embodiments, a computer program including instructions which, when executed by at least one processor, causes the at least one processor to carry out the functionality of serving node 14 or a node (e.g., a processing node 42) implementing one or more of the functions 52 of the serving node 14 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
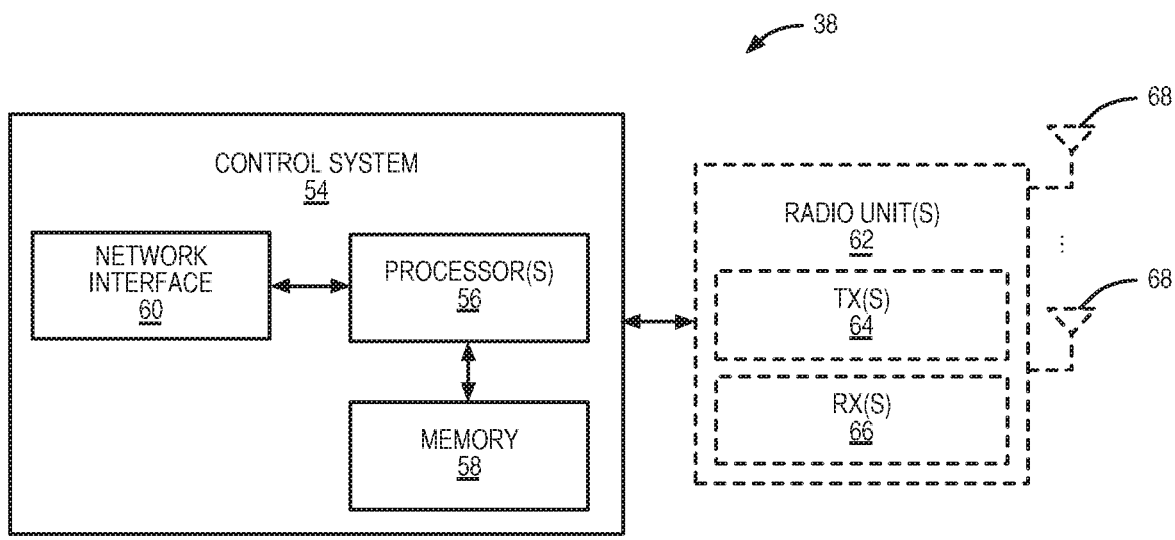
FIG. 11 is a block diagram of an exemplary embodiment of a base station (e.g., an eNB), according to some embodiments of the present disclosure.

FIG. 11 is a block diagram of an exemplary embodiment of a base station (e.g., an eNB 26), according to some embodiments of the present disclosure. The eNB 26 includes a control system 54 that includes one or more processors 56 (e.g., CPUs, ASICs, FPGAs, and/or the like), memory 58, and a network interface 60. In addition, the eNB 26 includes one or more radio units 62 that each include one or more transmitters 64 and one or more receivers 66 coupled to one or more antennas 68. In some embodiments, the radio unit(s) 62 is external to the control system 54 and connected to the control system 54 via, e.g., a wired connection (e.g., an optical cable). However, in some other embodiments, the radio unit(s) 62 and potentially the antenna(s) 68 are integrated together with the control system 54. The one or more processors 56 operate to provide one or more functions of an eNB 26 as described herein. In some embodiments, the function(s) are implemented in software that is stored, e.g., in the memory 58 and executed by the one or more processors 56.

Figure 12:
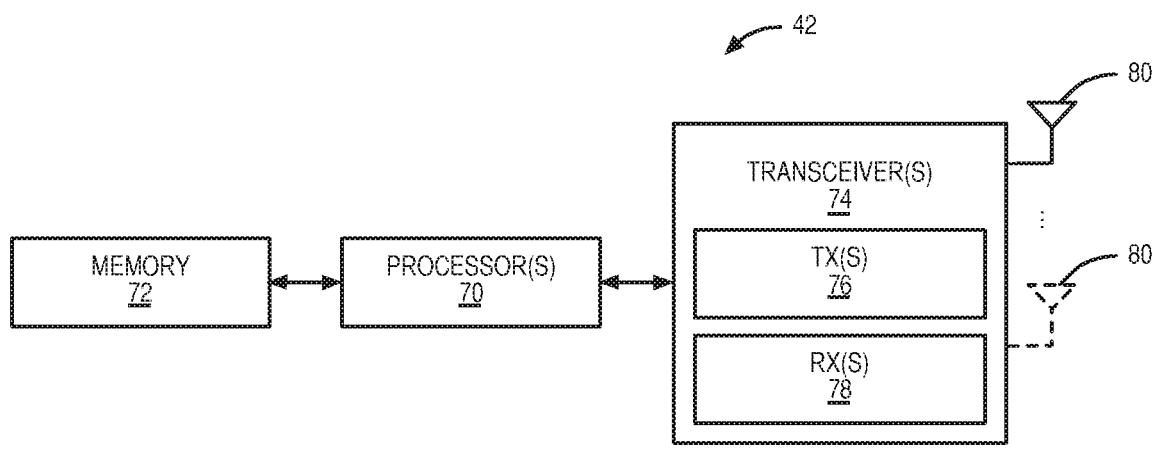
FIG. 12 is a block diagram of an exemplary embodiment of a user equipment, according to some embodiments of the present disclosure.

FIG. 12 is a block diagram of an exemplary embodiment of a UE 30, according to some embodiments of the present disclosure.

As illustrated, the UE 30 includes one or more processors 70 (e.g., CPUs, ASICs, FPGAs, and/or the like), memory 72, and one or more transceivers 74 each including one or more transmitters 76 and one or more receivers 78 coupled to one or more antennas 80. In some embodiments, the functionality of the UE 30 described above may be fully or partially implemented in software that is, e.g., stored in the memory 72 and executed by the processor(s) 70.

While specific embodiments are discussed above, it should also be understood that any appropriate combination of any of the specific embodiments is also possible.

The following acronyms are used throughout this disclosure.

3GPP Third Generation Partnership Project
5G Fifth Generation
ASIC Application Specific Integrated Circuit
AVP Attribute Value Pair
C-IoT Cellular Internet of Things
CPE Customer Premises Equipment
CPU Central Processing Unit
D2D Device-to-Device
eNB Enhanced or Evolved Node B
FPGA Field Programmable Gate Array
GPRS General Packet Radio Service
GTP GPRS Tunneling Protocol
HSS Home Subscriber Service
IDR Insert Subscriber Data Request
IMSI International Mobile Subscriber Identity
LEE Laptop Embedded Element
LME Laptop Mounted Element
LTE Long Term Evolution
LTE-A LTE-Advanced
M2M Machine-to-Machine
MCE Multi-Cell/Multicast Coordination Entity
MDT Minimization of Drive Test
MME Mobility Management Entity
MTC Machine Type Communication
NR New Radio
PDN-GW Packet Data Network Gateway
P-GW Packet Data Network Gateway
RAN Radio Access Network
RAT Radio Access Technology
RRH Remote Radio Head
RRU Remote Radio Unit
SGSN Serving GPRS Support Node
S-GW Servicing Network Gateway
SON Self-Organizing Network
UE User Equipment
ULA Update Location Answer
USB Universal Serial Bus
UTRA Universal Terrestrial Radio Access Those skilled in the art will recognize improvements and modifications to the embodiments of the present disclosure. All such improvements and modifications are considered within the scope of the concepts disclosed herein and the claims that follow.

What is claimed is:

1. A method of operation of a serving node in a communication network for updating subscriber data, comprising:
   receiving a modification of subscriber data for one or more subscribers;
   determining if updates to the subscriber data for the one or more subscribers are needed now, where determining if the updates are needed now is not based on reachability of the one or more subscribers;
   in response to determining that the updates to the subscriber data are needed now, communicating the modification of the subscriber data for the one or more subscribers to one or more additional nodes;
   in response to determining that the updates to the subscriber data are not needed now, postponing the communication of the modification of the subscriber data for the one or more subscribers;
   determining that a user equipment has entered an active state where the user equipment has an associated subscriber;
   determining if communication of the modification of the subscriber data for the associated subscriber has been postponed; and
   in response to determining that the communication has been postponed, communicating the modification of the subscriber data for a subscriber to the one or more additional nodes.

2. The method of claim 1 wherein the one or more subscribers comprises a plurality of subscribers.

3. The method of claim 1 wherein receiving the modification of subscriber data comprises receiving the modification of subscriber data from a Home Subscriber Service (HSS).

4. The method of claim 1 wherein receiving the modification of subscriber data for the one or more subscribers comprises receiving the modification of subscriber data for a group of subscribers.

5. The method of claim 4 wherein the group of subscribers is identified by a Reset-ID.

6. The method of claim 1 wherein determining if the updates to the subscriber data for the one or more subscribers are needed now comprises determining if the user equipment associated with the subscriber is in the active state.

7. The method of claim 6 wherein the active state is a CONNECTED state.

8. The method of claim 1 wherein postponing the communication of the modification of the subscriber data for the one or more subscribers comprises storing an indication that the one or more subscribers have a modification that needs to be communicated.

9. The method of claim 8 wherein the indication is a subscription data updated flag.

10. The method of claim 9 wherein the subscription data updated flag has a value of NOT_COMMITTED.

11. The method of claim 8 wherein the indication is a specific value for a "Location Information Confirmed in the Home Subscriber Service (HSS)" parameter.

12. The method of claim 11 wherein the specific value is UPDATED_NOT_COMMITTED.

13. The method of claim 1 wherein the serving node is a Mobility Management Entity (MME).

14. The method of claim 1 wherein the serving node is a Serving General Packet Radio Service (GPRS) Support Node (SGSN).

15. The method of claim 1 wherein at least one of the one or more subscribers is associated with a Machine-Type Communications (MTC) device.

16. A method of operation of a serving node in a communication network for updating subscriber data, comprising:
    determining that a user equipment has entered an active state where the user equipment has an associated subscriber;
    determining if communication of a modification of the subscriber data for the associated subscriber has been postponed, where the postponement of the modification is not based on reachability of the associated subscriber;
    in response to determining that the communication has been postponed, communicating the modification of the subscriber data for a subscriber to one or more additional nodes.

17. The method of claim 16 wherein the serving node is a Mobility Management Entity (MME).

18. The method of claim 16 wherein the serving node is a Serving General Packet Radio Service (GPRS) Support Node (SGSN).

19. The method of claim 16 wherein the user equipment is a Machine-Type Communications (MTC) device.

20. A method of operation of a serving node in a communication network for updating subscriber data, comprising:
    determining that a user equipment has moved to a second serving node where the user equipment has an associated subscriber;
    determining if communication of a modification of the subscriber data for the associated subscriber has been postponed, where the postponement of the modification is not based on reachability of the associated subscriber;
    in response to determining that the communication has been postponed, communicating the modification of the subscriber data for the associated subscriber to the second serving node.

21. The method of claim 20 wherein at least one of the serving node and the second serving node is a Mobility Management Entity (MME).

22. The method of claim 20 wherein at least one of the serving node and the second serving node is a Serving General Packet Radio Service (GPRS) Support Node (SGSN).

23. The method of claim 20 wherein the user equipment is a Machine-Type Communications (MTC) device.

24. A serving node in a communication network for updating subscriber data, comprising:
    at least one processor; and
    memory storing instructions executable by the at least one processor whereby the network node is operable to:
        receive a modification of subscriber data for one or more subscribers;
        determine if updates to the subscriber data for the one or more subscribers is needed now, where determining if the updates are needed now is not based on reachability of the one or more subscribers;
        in response to determining that the updates to the subscriber data are needed now, communicate the modification of the subscriber data for the one or more subscribers to one or more additional nodes;
        in response to determining that the updates to the subscriber data are not needed now, postpone the communication of the modification of the subscriber data for the one or more subscribers;
        determine that a user equipment has entered an active state where the user equipment has an associated subscriber;
        determine if communication of the modification of the subscriber data for the associated subscriber has been postponed; and
        in response to determining that the communication has been postponed, communicate the modification of the subscriber data for a subscriber to the one or more additional nodes.

* * * * *